US006701153B1

(12) United States Patent
Chang et al.

(10) Patent No.: US 6,701,153 B1
(45) Date of Patent: Mar. 2, 2004

(54) METHODS AND SYSTEMS FOR DETERMINING THE LOCATION OF MOBILES IN A UMTS TELECOMMUNICATIONS SYSTEM

(75) Inventors: Kirk K. Chang, Morganville, NJ (US); On-Ching Yue, Middletown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 345 days.

(21) Appl. No.: 09/628,011

(22) Filed: Jul. 28, 2000

(51) Int. Cl.[7] .................................. H04Q 7/20
(52) U.S. Cl. ................. 455/456.1; 455/456.2; 455/456.3; 455/427
(58) Field of Search .................. 455/456, 457, 455/403, 414, 404, 427, 456.1, 456.2, 456.3, 456.4, 12.1, 13.6; 701/207, 213, 214; 342/387.06, 357.12

(56) References Cited

U.S. PATENT DOCUMENTS

| | | | | |
|---|---|---|---|---|
| 6,222,483 | B1 * | 4/2001 | Twitchell et al. ........ | 342/357.09 |
| 6,252,545 | B1 * | 6/2001 | Da et al. .................... | 246/89 |
| 6,275,707 | B1 * | 8/2001 | Reed et al. ................ | 455/456 |
| 6,453,237 | B1 * | 9/2002 | Fuchs et al. ............... | 701/213 |
| 6,570,529 | B2 * | 5/2003 | Richton et al. ........... | 342/357.02 |
| 6,584,314 | B1 * | 6/2003 | Haumont et al. .......... | 370/337 |
| 2001/0048387 | A1 * | 12/2001 | Sheynblat ................ | 342/357.09 |
| 2002/0077126 | A1 * | 6/2002 | Pihl et al. .................. | 455/456 |
| 2003/0060212 | A1 * | 3/2003 | Thomas ..................... | 455/456 |
| 2003/0076792 | A1 * | 4/2003 | Theimer .................... | 370/328 |

FOREIGN PATENT DOCUMENTS

WO   WO 2067462 A1 * 8/2002   ........... H04B/7/185

* cited by examiner

*Primary Examiner*—Nay Maung
*Assistant Examiner*—Edan Orgad

(57) ABSTRACT

A Universal Mobile Telecommunications System ("UMTS") is modified to provide location-determining services similar to Wireless-Assisted-GPS ("WAG") services to mobiles without requiring the deployment of a GPS receiver inside the UMTS network. The resulting network is known as a UMTS Network Assisted GPS ("UNAG") network. A UNAG network is created by deploying a UNAG server inside a UMTS network. The UNAG server provides WAG-like services to mobiles. Only one UNAG server is needed in an entire system, allowing the cost of the UNAG server to be amortized over a number of Mobile Switching Centers ("MSCs") in the UMTS network. The UNAG server provides excellent location-prediction accuracy and reduces the amount of time required to determine the location of a mobile in a UMTS network.

14 Claims, 2 Drawing Sheets

METHODS AND SYSTEMS FOR DETERMINING THE LOCATION OF MOBILES IN A UMTS TELECOMMUNICATIONS SYSTEM

BACKGROUND OF THE INVENTION

Traditionally, in order to estimate the location of a mobile telecommunications unit ("mobile"), such as a cellular phone, a laptop computer, a personal digital assistant or the like, the mobile needs to receive and decode signals from four distinct Global Positioning System ("GPS") satellites. These signals contain two sources of information from which a mobile's location can be computed: 1) pseudo-ranging information; and 2) the satellites' ephemeris. Pseudo-ranging information is used to compute the time difference of arrival of the signals from the satellites to a destination (in this case, the mobile). The satellites' ephemeris comprises information about the exact locations of the satellites in space, typically compiled in a tabular format. With these two sources of information, it is possible to determine the location of a mobile using a triangulation technique.

There exists IS-95 based WAG systems which provide location predictions with a high level of accuracy (e.g., within about 15 feet). Such WAG systems take advantage of the fact that there are GPS receivers in IS-95 base stations, which have radio connections to mobiles, and in MSCs for synchronization purposes. These same GPS receivers are used by WAG systems to reduce the time required to determine the location of a mobile. The primary goal of WAG is to reduce the processing and computing load on a mobile. This goal is met by removing the need for the mobile to process or compute pseudo-ranging information and ephemeris information contained in a GPS signal. To accomplish this, a WAG server is placed in a MSC accompanied by a full GPS receiver to perform the bulk of the signal processing and computation. Assuming the MSC to which the mobile is connected can receive signals from the same satellites as the mobile because of its proximity to the mobile (e.g., less than 100 km), the MSC can tell the four satellites, from among twenty-four GPS satellites, to which the mobile needs to tune. This information significantly reduces the time required for the mobile to search for visible satellites. Furthermore, since the MSC's GPS receiver is capable of decoding pseudo-ranging and ephemeris information, it is not necessary for the mobile to process this information, thus reducing the processing load on the mobile. This reduction in processing load on mobiles allows for the use of simplified GPS receivers in WAG-capable mobiles.

The present invention concerns the determination of a mobile's location in a UMTS network. UMTS is a third-generation wireless system which is designed to support high-data-rate multimedia services. However, in a UMTS network, the base stations are not synchronized. This means that GPS receivers are not required for the operation of a UMTS. The lack of GPS receivers complicates the implementation of WAG-like services in a UMTS network. One way of providing WAG-like services in a UMTS would be to add GPS receivers to MSCs in a UMTS landline network. However, this solution would significantly increase the overall cost of the system.

Accordingly, it is desirable to provide methods and systems for implementing WAG-like services in UMTS networks that do not require the addition of traditional GPS receivers.

SUMMARY OF THE INVENTION

The present invention provides methods and systems for determining the location of mobiles in a telecommunications system. More specifically, the present invention comprises methods and systems for locating a mobile within a UMTS network. According to embodiments of the present invention, a UNAG server is deployed within a UMTS landline network and is adapted to provide WAG-like services to mobiles comprising simplified GPS receivers. The UNAG server contacts a GPS Master Control Station (MCS), such as the one located in Colorado Springs, Colorado, to obtain orbital positioning information on all GPS satellites. When a mobile requests information about its location, the UNAG server processes the orbital positioning information to determine which four GPS satellites should be visible to the mobile. The UNAG server then transmits tuning information associated with the four satellites to the mobile, which enables the mobile to receive GPS information from the four satellites. Next, the mobile decodes pseudo-ranging information from within the GPS information and transmits it to the UNAG server. The UNAG server processes the pseudo-ranging information associated with the mobile along with the previously calculated positions of the four satellites to calculate the geographic location of the mobile. Finally, the UNAG server transmits location information back to the mobile.

UNAG networks envisioned by the present invention comprise faster and more cost-effective methods and systems for determining the location of mobiles in a UMTS network. The present invention and its advantages can best be understood with reference to the drawings, detailed description of the invention and claims which follow.

DETAILED DESCRIPTION OF THE INVENTION

The present invention provides methods and systems for determining the location of mobiles in a UMTS network. According to one embodiment of the present invention, a novel UMTS network, hereafter referred to as a "UNAG network" is created by deploying a UNAG server within a landline network. The novel network is adapted to locate mobiles using WAG-like, location-determining capabilities without requiring the deployment of traditional GPS receivers in the network. According to the present invention, the geographic location of a mobile can be determined through a series of communications sent back and forth between a mobile and UNAG server.

For example, a UNAG server first contacts a GPS MCS at least once a day to obtain information about the position of GPS satellites. When a request for location information arrives from a mobile, the UNAG server is adapted to compute the positions of all of the GPS satellites by processing the information obtained from the GPS MCS and is then adapted to identify four satellites from which the mobile can receive signals. The UNAG server is thereafter adapted to transmit tuning information associated with these four satellites to the mobile.

Upon receiving this information from the UNAG server, the mobile is then adapted to tune to these four satellites, to receive information from them, to decode information from within the received information and to subsequently transmit the decoded information to the UNAG server.

Upon receiving this decoded information, the UNAG server is adapted to process the information transmitted from the mobile along with the previously calculated positions of the four satellites and is further adapted to calculate the location of the mobile. Finally, the UNAG server is adapted to transmit the calculated location back to the mobile in the form of "location information".

Because the UNAG server processes much of the information transmitted by the satellites and calculates the location of the mobile, this burden is removed from the mobile. This helps reduce the time required to determine the location of the mobile and allows for the use of simpler, less expensive mobiles. The present invention will now be described in detail using additional illustrative examples.

Figure 1:
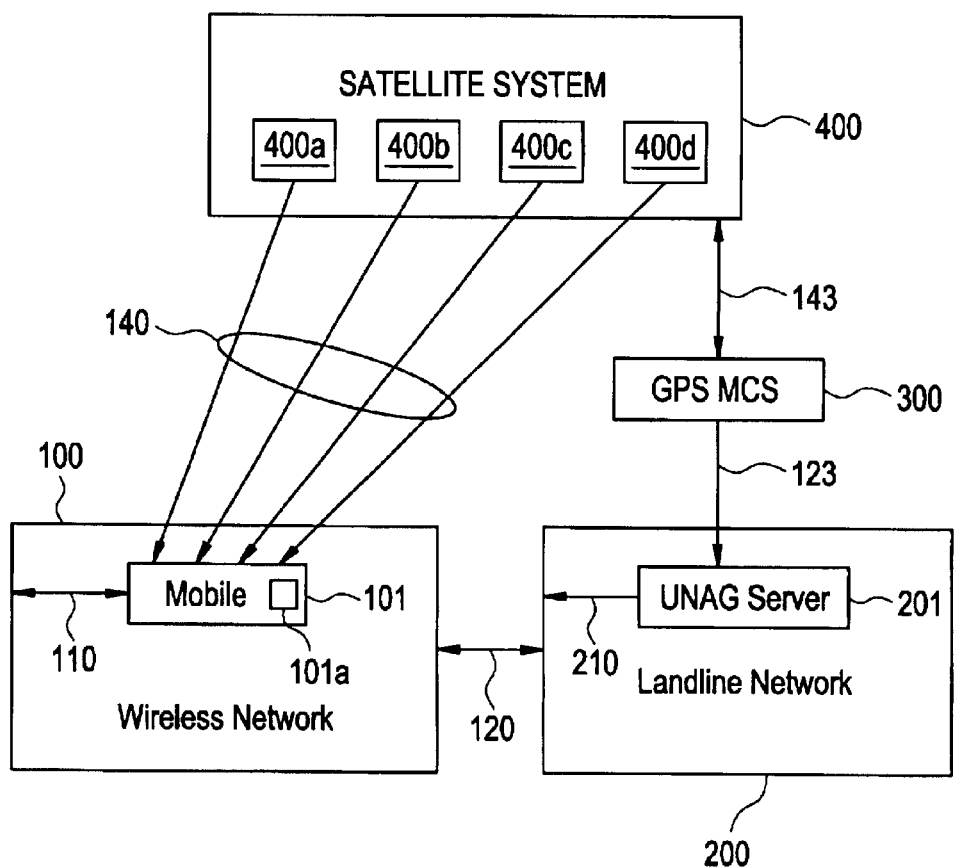
FIG. 1 is a schematic representation of a network according to one embodiment of the present invention.

FIG. 1 depicts a schematic representation illustrating one embodiment of the present invention. Referring to FIG. 1, UNAG network 1 comprises wireless network 100, landline network 200, GPS MCS 300 and GPS satellites 400. Wireless network 100 comprises a mobile 101. Mobile 101 is adapted to send and receive information within the wireless network 100 via pathway 110. Mobile 101 comprises a simplified GPS receiver ("mobile GPS") 101a which is adapted to receive GPS information from GPS satellites 400 and is further adapted to decode only pseudo-ranging information from within GPS information. In an illustrative embodiment of the invention, mobile GPS 101a comprises a mobile GPS similar to those used in WAG-capable, IS-95 based mobiles. Continuing, landline network 200 comprises UNAG server 201. UNAG server 201 is connected to landline network 200 through pathway 210 and is connected to GPS MCS 300 through a dedicated pathway 123. Landline network 200 and wireless network 100 are adapted to communicate with each other via pathway 120. In one embodiment of the present invention, UNAG server 201 comprises a general-purpose workstation.

Satellites 400 comprise twenty-four satellites which orbit the earth. Satellites 400 are adapted to transmit GPS information to the mobile GPS 101a via pathways 140 and to transmit orbital positioning information to the GPS MCS 300 via pathway 143. The GPS information and orbital information transmitted by satellites 400 is carried within a Course Acquisition ("C/A") signal. The C/A signal associated with each satellite 400 comprises a unique Pseudo-Random Noise ("PRN") sequence. This enables GPS-capable devices to tune to particular satellites by matching PRN sequences and further enables such devices to identify which satellite is sending a particular signal. Continuing, GPS MCS 300 is adapted to transmit information to GPS satellites 400 and to adjust/fine-tune their orbital position. UNAG server 201 is adapted to access orbital positioning information in GPS MCS 300 through a dedicated connection or pathway 123. Thereafter, UNAG server 201 is further adapted to calculate the location of the mobile and to transmit location information to the mobile. A further description of the operation of UNAG network 1 will now be provided.

UNAG server 201 is adapted to receive a request for location information from the mobile 101. In order for the location of mobile 101 to be determined, the mobile GPS 101a must receive GPS signals from four satellites. The first step in determining the location of the mobile 101 is to determine the four satellites from which mobile GPS 101a can receive signals. Because all of the satellites 400 are constantly moving, the four satellites from which the mobile GPS 101a can receive signals are also constantly changing. However, because the movement of satellites 400 is very predictable, their location at a particular time of day can always be calculated. A GPS MCS 300, such as the one located at Colorado Springs, Colo., is adapted to update and precisely tune the locations of all of the satellites 400 at least once a day to maintain the satellites' proper orbital positions. UNAG server 201 is adapted to contact the GPS MCS 300 at least once a day to obtain orbital positioning information associated with the satellites 400. This orbital positioning information comprises the satellites' ephemeris and pseudo-ranging information based on the location of GPS MCS 300. At any time during a day, upon receiving a request from mobile 101 for location information, UNAG server 201 is adapted to compute the exact positions of all twenty-four satellites 400 by processing the orbital positioning information, and is then adapted to identify specific satellites ("visible satellites"), such as satellites 400a–400d, from within satellites 400 which can be seen by the mobile 101. It should be understood that the present invention is not limited to receiving orbital information from an MCS. To the contrary, the UNAG server 201 may receive the orbital information from an MCS-like source. It so happens, however, that an MCS is presently the only source for such information.

Once visible satellites 400a–400d are identified, UNAG server 201 is adapted to transmit tuning information associated with visible satellites 400a–400d through landline network 200 and wireless network 100 to mobile 101. The tuning information comprises the PRN sequences associated with visible satellites 400a–400d. Continuing, mobile GPS 101a is adapted to tune to visible satellites 400a–400d by matching the PRN sequences transmitted to it by the UNAG server 201. Satellites 400a–400d are then adapted to transmit GPS information to mobile GPS 101a. Mobile GPS 101a is thereafter adapted to receive the GPS information and to decode pseudo-ranging information from within the GPS information. Mobile 101 is then adapted to transmit the decoded pseudo-ranging information to UNAG server 201 via the wireless network 100 and landline network 200. UNAG server 201 is adapted to process the decoded pseudo-ranging information associated with the mobile 101 along with the previously calculated positions of the visible satellites 400a–400d and is then adapted to calculate the location of the mobile 101. UNAG server 201 is thereafter adapted to transmit location information back to mobile 101, thus completing one cycle of an illustrative embodiment of the present invention.

Figure 2:
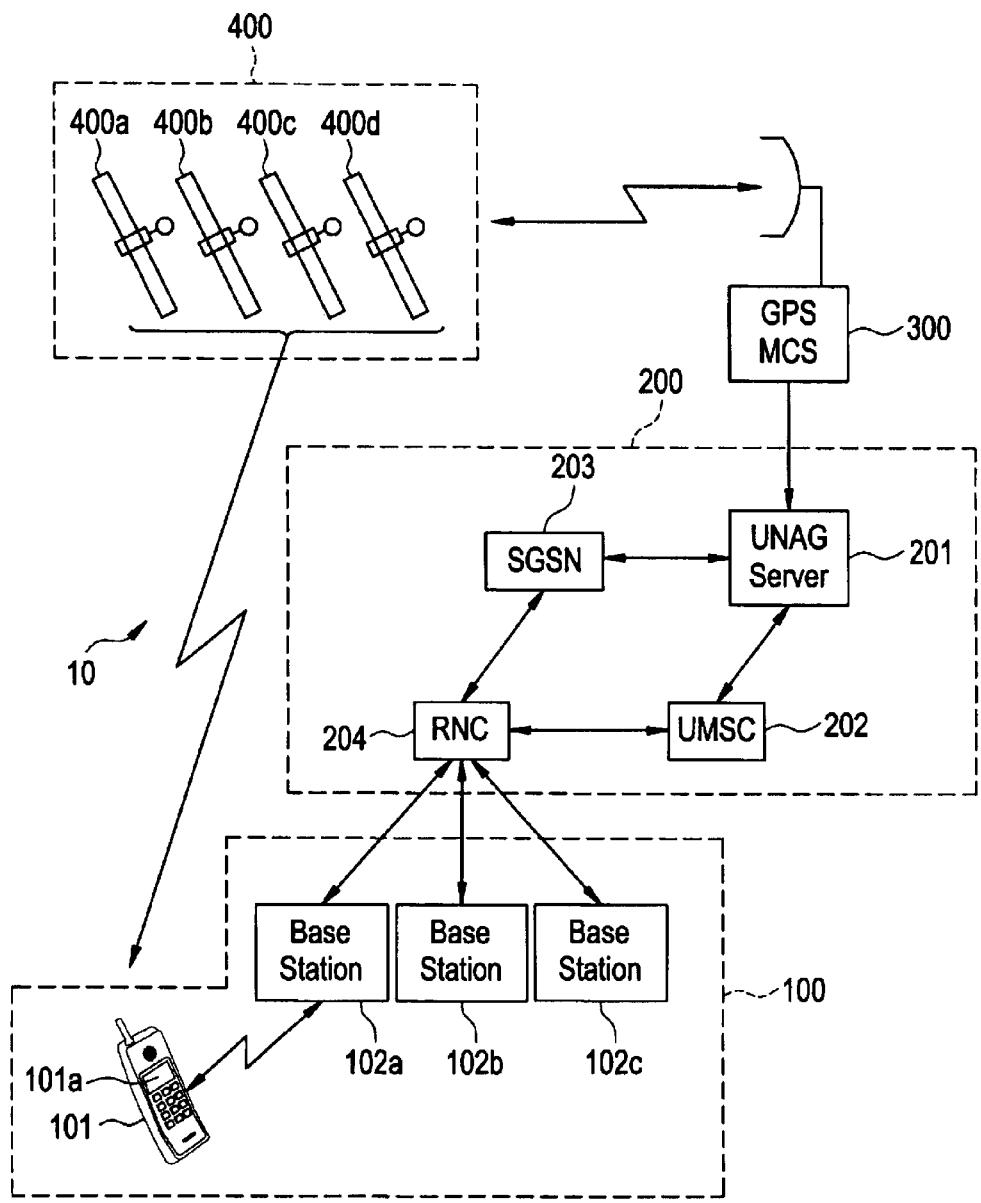
FIG. 2 depicts another schematic representation of a network according to another embodiment of the present invention.

FIG. 2 depicts another embodiment of the present invention. In an illustrative embodiment of the present invention, the components of FIG. 2 communicate as indicated by the arrows. Comparing FIG. 2 to FIG. 1, reference numbers which are repeated indicate substantially the same components.

Referring to FIG. 2, UNAG network 10 comprises wireless network 100, landline network 200, GPS MCS 300 and satellites 400. Landline network 200 comprises UNAG server 201, UMTS Mobile Switching Center ("UMSC") 202, Serving General Packet Radio Service-Service Node ("SGSN") 203 and Radio Network Controller ("RNC") 204. Mobile connections to landline network 200 are established through RNC 204 in combination with either UMSC 202 or SGSN 203, depending on the connection type. For voice communications, RNC 204 routes calls to UMSC 202 and then to a Public Switched Telephone Network (not shown). For data communications, the RNC 204 routes data packets to SGSN 203, through a Gateway GSN (not shown) and then out to a public data network (not shown). Since it is not known, a priori, whether a mobile is set up to transmit voice, data or both, UNAG server 201 is necessarily connected to both UMSC 202 and SGSN 203.

Continuing, wireless network 100 of FIG. 2 comprises mobile 101 and base stations 102a–102c. Mobile 101 comprises mobile GPS 101a and is communicatively connected to base station 102a. The particular configuration of base stations 102a–102c and mobile 101 is by way of example only. It is to be understood that other embodiments may comprise any number of base stations and/or mobiles.

The UNAG network 10 of FIG. 2 operates similarly to the UNAG network 1 in FIG. 1. Upon receiving a request for location information from mobile 101, UNAG server 201 is adapted to compute the positions of the satellites 400 by processing orbital positioning information it has received from the satellites 400, and is then adapted to identify satellites 400a–400d as those from which the mobile 101 can receive signals. In one embodiment of the invention, UNAG server 201 is adapted to identify visible satellites 400a–400d based on the location of the base station that is communicatively connected (or "assigned ") to the mobile 101. For example, because base station 102a is assigned to mobile 101, the location of base station 102a can be used to identify visible satellites 400a–400d. Backtracking somewhat, it is possible to use the location of UMSC 202 to identify visible satellites 400a–400d, as is done in WAG systems which comprise a MSC. However, in a rural environment with very large cells, it is possible that the service area of a MSC could exceed the one hundred-square-mile limit within which a mobile and a MSC are able to receive signals from the same four satellites. The same possibility exists with a UMSC in the UNAG network 10, since an MSC and UMSC are analogous components.

Using the location of UMSC 202 to determine which four satellites are visible to mobile 101, therefore, could result in the wrong satellites being identified. On the other hand, using the location of base station 102a to identify visible satellites 400a–400d ensures that satellites 400a–400d will be identified correctly. This is because base stations 102a–102c will almost always be located so that they can receive signals from the same satellites as the mobiles 101 to which they are assigned.

Once visible satellites 400a–400d are identified, UNAG server 201 is adapted to transmit tuning information associated with satellites 400a–400d through the landline network 200 and base station 102a to mobile 101. Again, based on this information, mobile GPS 101a is adapted to tune to satellites 400a–400d. Once satellites 400a–400d have transmitted GPS information to mobile 101, mobile GPS 101a is thereafter adapted to decode the pseudo-ranging information within the GPS information. Mobile 101 is then adapted to transmit the decoded, pseudo-ranging information to UNAG server 201 via base station 102a, RNC 204 and either UMSC 202 or SGSN 203. UNAG server 201 is adapted to process the decoded pseudo-ranging information associated with the mobile 101 along with the previously calculated positions of visible satellites 400a–400d. Thereafter, UNAG server 201 is adapted calculate the location of the mobile 101 and to transmit location information to mobile 101, thus completing a cycle of the present invention.

In sum, the present invention enables a UNAG network to provide highly accurate, high-speed location information to mobiles in a cost-effective manner. The UNAG server is adapted to perform the functions of a WAG server and a GPS receiver. This allows WAG-like services to be provided to mobiles in existing UMTS networks without requiring the deployment of traditional GPS receivers within UMTS landline networks. Because a UNAG network is created by deploying a single UNAG server in a UMTS network, the cost of the UNAG server can be amortized over the number of MSCs in the network. Since the UNAG server is capable of processing orbital positioning information and transmitting tuning information associated with visible satellites to a mobile, the time required for a mobile to search for visible satellites is reduced. The mobile can quickly tune to visible satellites by matching PRN sequences provided by the UNAG server instead of searching through the PRN sequences associated with all twenty-four GPS satellites. Furthermore, because much of the processing is done by the UNAG server, mobiles need only comprise less expensive, simplified GPS receivers. Such processing also reduces the time required to calculate the location of the mobile.

Though much of the discussion above focused on a mobile as an assembled device, such as a cellular phone, the present invention is not so limited. Rather, the present invention envisions embodiments where a "mobile" comprises a component of an assembled device, such as a transceiver.

Other advantages of the present invention will be readily apparent to those skilled in the art. It is to be understood that variations can be made by those skilled in the art without exceeding the scope and spirit of the present invention.

We claim:

1. A system for determining the location of a mobile in a UMTS network, comprising:
   a UNAG sever adapted to:
   obtain orbital positioning information associated with a plurality of GPS satellites;
   identify visible satellites from within the plurality of GPS satellites based on the orbital positioning information;
   transmit tuning irformation associated with the plurality of visible satellites to the mobile; and
   calculate the location of a mobile.

2. The system of claim 1, wherein the UNAG server is further adapted to identify the visible satellites based on a location of a base station assigned to the mobile.

3. The system of claim 1, wherein the UNAG server is further adapted to transmit location information to the mobile.

4. The system of claim 1, further comprising a mobile adapted to transmit decoded pseudo-ranging information to the UNAG server.

5. The system of claim 4, wherein the mobile is further adapted to:
   tune to visible satellites from within GPS satellites;
   receive GPS information from the visible satellites; and
   decode pseudo-ranging information from within the GPS information.

6. The system of claim 5, wherein the mobile comprises a simplified GPS receiver.

7. A mobile adapted to:
   tune to visible satellites selected from a plurality of GPS satellites;
   receive GPS information from the visible satellites:
   decode pseudo-ranging information from within the GPS information; and
   transmit the decoded pseudo-ranging information to a UNAG server to calculate the location of the mobile.

8. The mobile of claim 7, wherein the mobile comprises a simplified GPS receiver.

9. A method for determining the location of a mobile in a UMTS network, comprising:
    obtaining orbital positioning information associated with a plurality of GPS satellites;
    identifying visible satellites from within the plurality of GPS satellites based on the orbital positioning information;
    transmitting tuning information associated with the visible satellites to the mobile from a UNAG server; and
    calculating the location of a mobile using the UNAG server.

10. The method of claim 9, further comprising identifying the visible satellites based on a location of a base station assigned to the mobile.

11. The method of claim 9, further comprising transmitting location information to the mobile from the UNAG server.

12. The method of claim 9, further comprising transmitting decoded pseudo-ranging information from the mobile to the UNAG server.

13. The method of claim 12 further comprising:
    tuning to visible satellites from within GPS satellites;
    receiving GPS information from the visible satellites; and
    decoding pseudo-ranging information from within the GPS information.

14. A method for determining the location of a mobile in a UMTS network, comprising:
    tuning to visible satellites selected from a plurality of GPS satellites;
    receiving GPS information from the visible satellites;
    decoding pseudo-ranging information from within the GPS information; and
    transmitting the decoded pseudo-ranging information to a UNAG sever from a mobile.

* * * * *